April 28, 1931.　　　A. L. SMITH　　　1,802,358
LAWN MOWER
Filed Aug. 26, 1925　　　5 Sheets-Sheet 4

Inventor
Alvin L. Smith
By his Attorneys
Ward, Crosby & Smith

Patented Apr. 28, 1931

1,802,358

UNITED STATES PATENT OFFICE

ALVIN L. SMITH, OF NEWBURGH, NEW YORK, ASSIGNOR TO COLDWELL LAWN MOWER COMPANY, OF NEWBURGH, NEW YORK, A CORPORATION OF NEW YORK

LAWN MOWER

Application filed August 26, 1925. Serial No. 52,494.

This invention relates to motor driven implements such as agricultural machines including lawn mowers and more particularly those which may be driven by an electrical motor.

One of the objects of this invention is to provide an electrically driven machine having an improved take-up reel arrangement for the conductor of the motor. A further object of the invention is to provide a durable but relatively simple means for driving the take-up reel and for driving such reel at the proper speed to keep the conductor properly wound regardless of the operation of the machine. Another object is to provide for such a reel a fixed support and a simple form of swivelled pulley surmounting the reel to efficiently lead the conductor away therefrom in various directions.

A further aim of the invention is to provide a relatively simple but durable arrangement of an electric motor and associated driving mechanism upon the frame of a machine of the type above indicated, such mechanism being mounted with the parts in accessible positions whereby they may be readily assembled or taken apart.

Other objects, features and advantages will be apparent from the following description taken in connection with the accompanying drawings in which.

Figure 1:
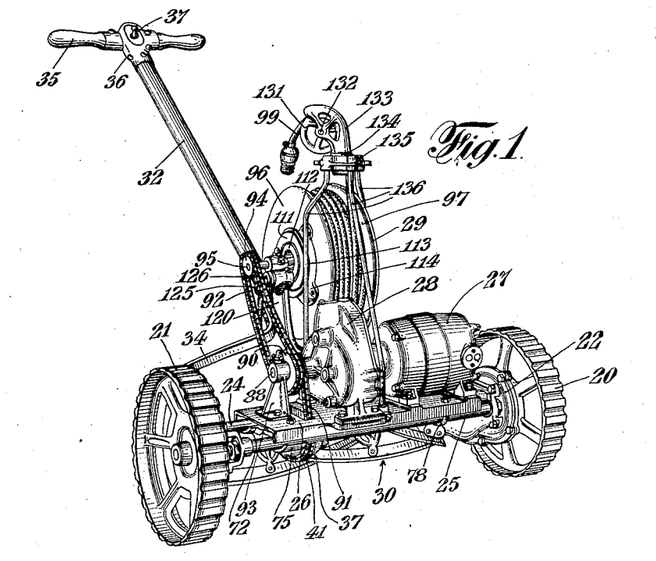
Fig. 1 is a perspective front view of the assembled machine embodying this invention.
Figure 2:
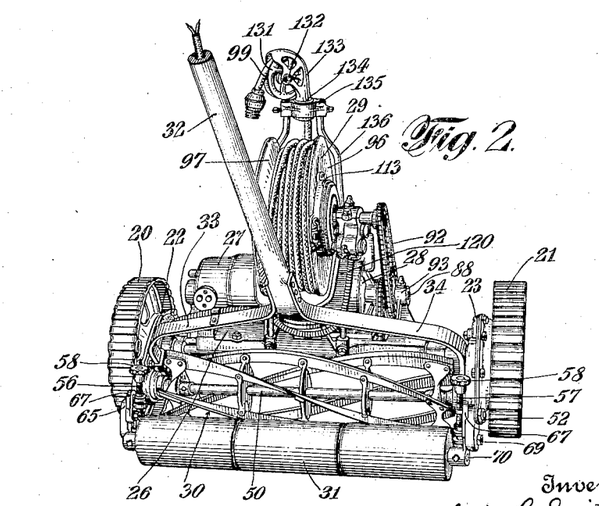
Fig. 2 is a rear view in perspective of the same machine.

The lawn mower as illustrated in Figs. 1 and 2 may comprise a pair of side wheels 20 and 21, and side frame members 22 and 23, which may be connected by tie rods 24 and 25. Upon the tie rods a bed plate 26 may be mounted for carrying an electric driving mechanism including an electric motor 27, a reduction gearing assembly 28, and a take-up reel 29 for carrying the conductor cable of the electric motor. To the rear of the bed plate 26 a suitable form of revolving cutter assembly 30 and rollers as at 31 may be mounted. The machine may be steered by means of a handle 32 attached to side frames 22 and 23 respectively by conventional forms of bails 33 and 34. The handle 32 may be provided at its upper end with suitable handle bars as at 35, fixed to the handle 32 by clamping plates at 36. At the junction of the handle bars 35 and within the clamping plates, a suitable snap switch 37 may be mounted for controlling the circuit to the motor.

Figure 4:
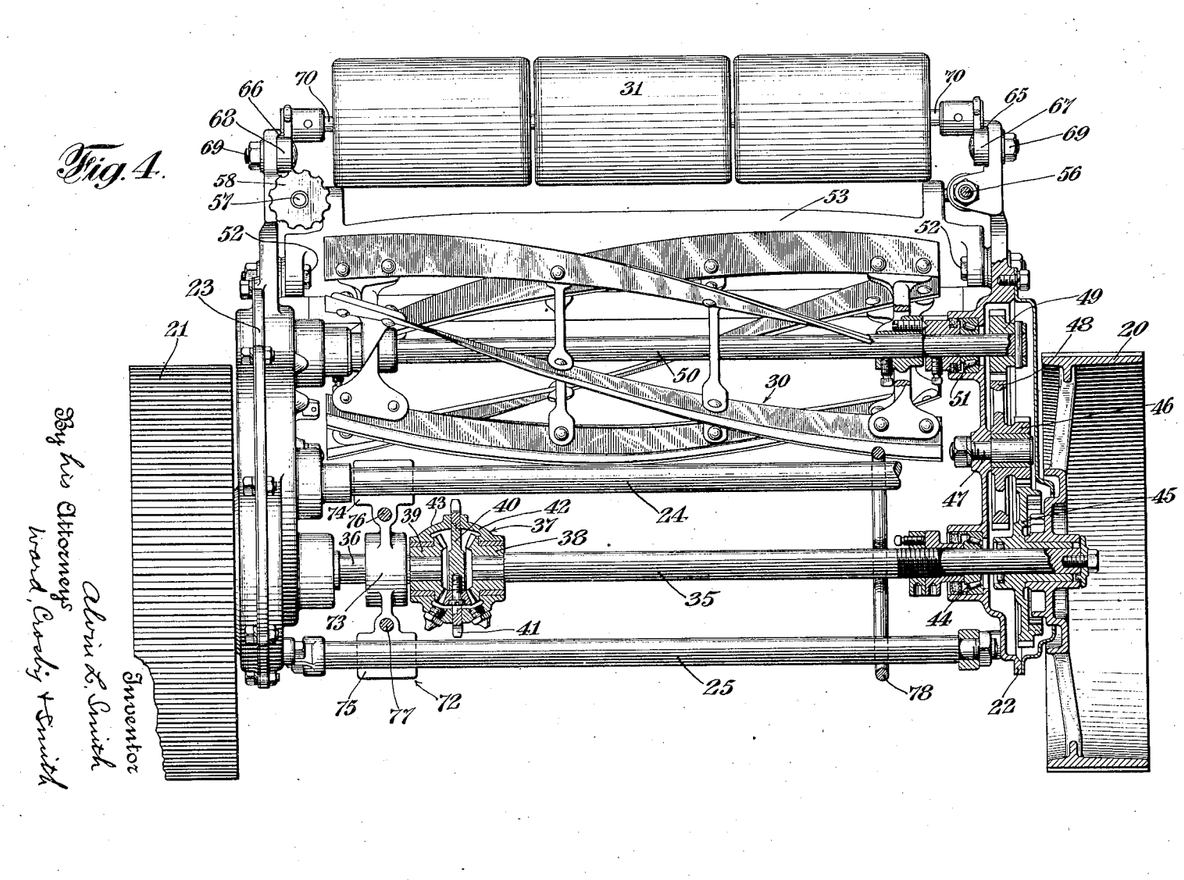
Fig. 4 is a plan view partly in section showing the lawn mower with the electrical driving mechanism removed.

Referring to Fig. 4 the frame and associated parts of the machine will now be further described in detail. The side wheels 20 and 21 are mounted to rotate upon shafts 35 and 36 respectively, extending through the side frames 22 and 23. The shafts 35 and 36 as indicated may be in alignment and driven by a differential gearing assembly 37 therebetween, the shaft ends bei_ respectively provided with differential gears 38 and 39 at each side of a spider member 40. The spider member carries differential pinions of the conventional form and may be provided at its periphery with a sprocket 41 through which power is applied to the shafts 35 and 36 from the electrically driven mechanism hereinafter described. Suitable housing members 42 and 43 are provided for the differential gear assembly, such housing members also being fixed in respect to the spider member and sprocket and serving as a support therefor.

The shafts 35 and 36 may extend through roller bearing assemblies as at 44 mounted within the side frames. A suitable train of gears is arranged within each of the side frames and in the example shown may comprise a gear 45 mounted upon the drive wheel shaft and co-acting with a middle gear 46 mounted upon a stud shaft 47 which is fixed in the frame. The gear 46 as indicated is provided with a pinion portion engaging the gear 45 and a larger portion 48 co-acting with a pinion 49. The pinion 49 is fixed to the end of a shaft 50 upon which the revolving cutter assembly 30 is mounted. Each end of the shaft 50 may be mounted within roller bearings as at 51. The details of construction of the above gear mechanism may correspond in general to that of ordinary types of hand driven lawn mowers.

Figure 3:
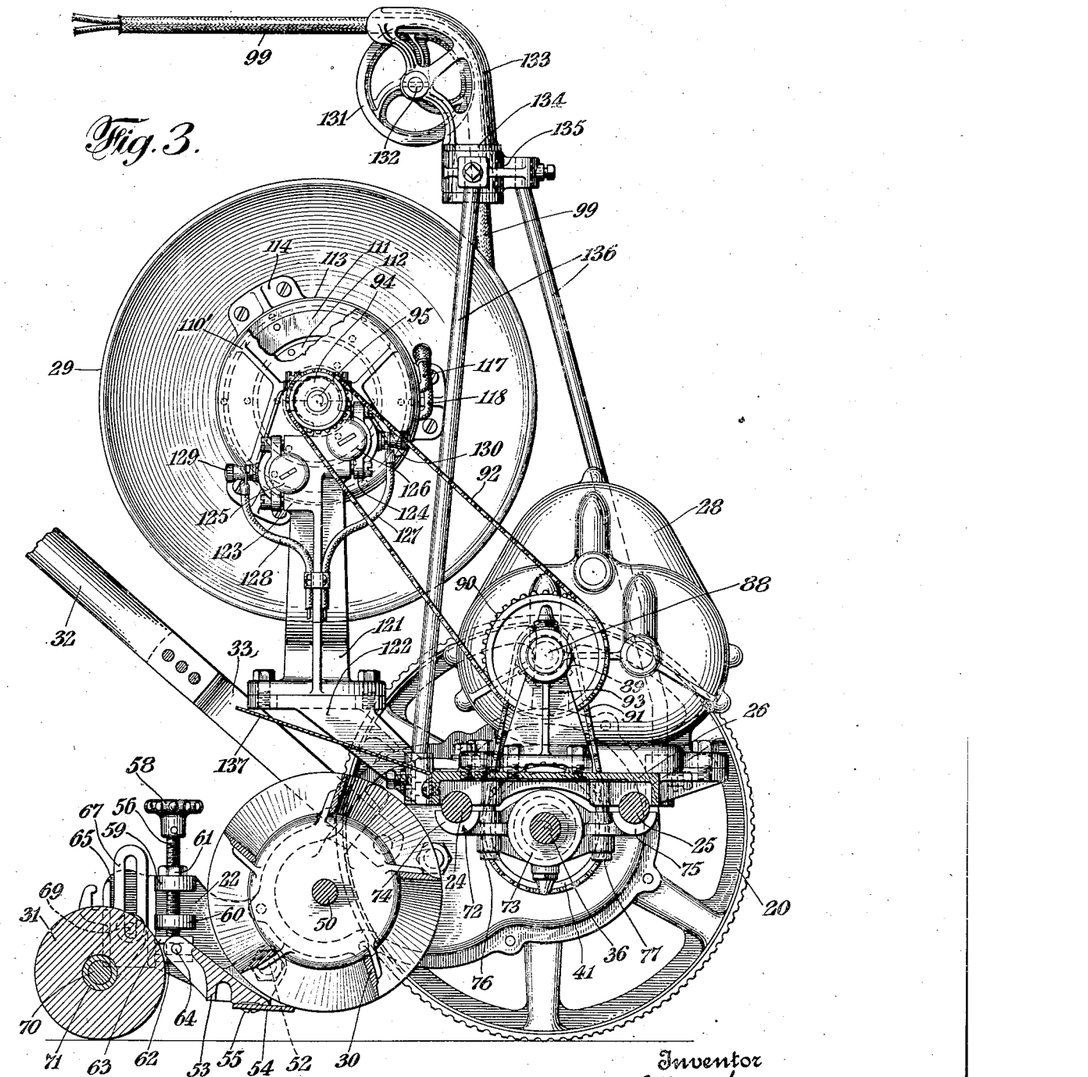
Fig. 3 is a sectional elevation view taken through the mid-portion of such a machine.

Referring to Fig. 3 in connection with Fig. 4, each of the side frames 22 and 23 extends rearwardly from the revolving cutter assembly and is provided with pivotal supports as at 52, for the ends of a knife bar 53. A fixed knife plate 54 is attached to the under side of the knife bar by screws 55. In order to adjust the angular position of the knife plate 54 around the pivoting points 52, the extensions of the side frame may be provided with adjusting screws as at 56 and 57. The adjusting screws may be provided with hand wheels as at 58 which permit of manual adjustment of the knife plate without the use of tools. The adjusting screws are received in threaded lugs as at 59 and 60 formed upon the side frames, the lugs 59 also cooperating with lock nuts as at 61 which may be used to permanently lock the screws in adjusted position if desired. The lower end of the adjusting screws may be provided with spaced flanges as at 62 and 63 for pivotally receiving a pin 64 that forms part of the knife bar. When the lock nut 61 is loosened the adjusting screw may be freely rotated by the hand wheels in order to adjust the position of the knife plate 54 in respect to the revolving cutter assembly 30. A sheet of paper or other thin material may be placed between the revolving cutter and the knife plate and while the revolving cutter is slowly turned by hand, the knife plate may be gradually elevated by screwing down the hand wheels. When the knife plate is sufficiently elevated to co-act properly with the revolving cutter, the paper will be sheared. This adjustment process should be repeated and the adjustment tested at each side of the cutter, whereupon the lock nuts 61 may be tightened to permanently secure the parts. With this form of construction the adjusting can be quickly and accurately accomplished, and the knife plate is maintained at all times fully under the control of the hand wheels.

Rearwardly of the adjusting screws 56 and 57, the side frames may be further extended and provided with vertical guideways as at 65 and 66 respectively for receiving roller attaching brackets 67 and 68. These brackets may be slotted for receiving bolts as at 69 for adjustably attaching them to the side frames. Between the brackets a roller shaft 70 extends upon which may be mounted the roller 31 comprising a plurality of sections of comparatively large diameter. These sections may be made of wood and provided with metal bearing rings as at 71 (see Fig. 3) for receiving the shaft.

The rollers 31 should preferably be of a comparatively large diameter as above stated in order that the weight of the entire machine may be readily received and moved thereon for purposes of backing the machine manually through short distances when desired. By reason of the slotted brackets 67 and 68 the height of the frame end members may be readily adjusted with respect to the roller and thereby the height of cut may be adjusted within comparatively wide limits.

As indicated in Figs. 3 and 4 a bracket 72 may be provided with a bearing portion 73 for receiving the shaft 36 and with end portions 74 and 75 respectively for engaging the tie rods 24 and 25. The bracket 72 through the bearing portion 73 thus serves to firmly retain the shaft 36 and the corresponding end of the differential assembly in proper position. The underside of the bed plate 26 may be formed with suitable portions complementary to the bracket 72, and the bracket and plate may be securely clamped together and to the tie rods 24 and 25 by suitable bolts 76 and 77. At the opposite end of the plate 26 a rod 78 may extend beneath the tie rods 24 and 25 and the shaft 35 transversely thereof with its ends extending up through the plate and threaded to receive clamping nuts as indicated in Fig. 1. In this manner a rigidly attached mounting plate 26 is conveniently provided for the various parts of the driving mechanism.

The electric power driving mechanism will now be further described in detail. The motor 27 may be rigidly bolted to the plate 26 and may comprise any suitable type of electric motor depending upon the current source with which it is desired to use the machine. A one-half horse power motor having a speed of approximately 6500 R. P. M. has been found to give satisfactory results.

Figures 5, 6, 7, 8, 9, 11:
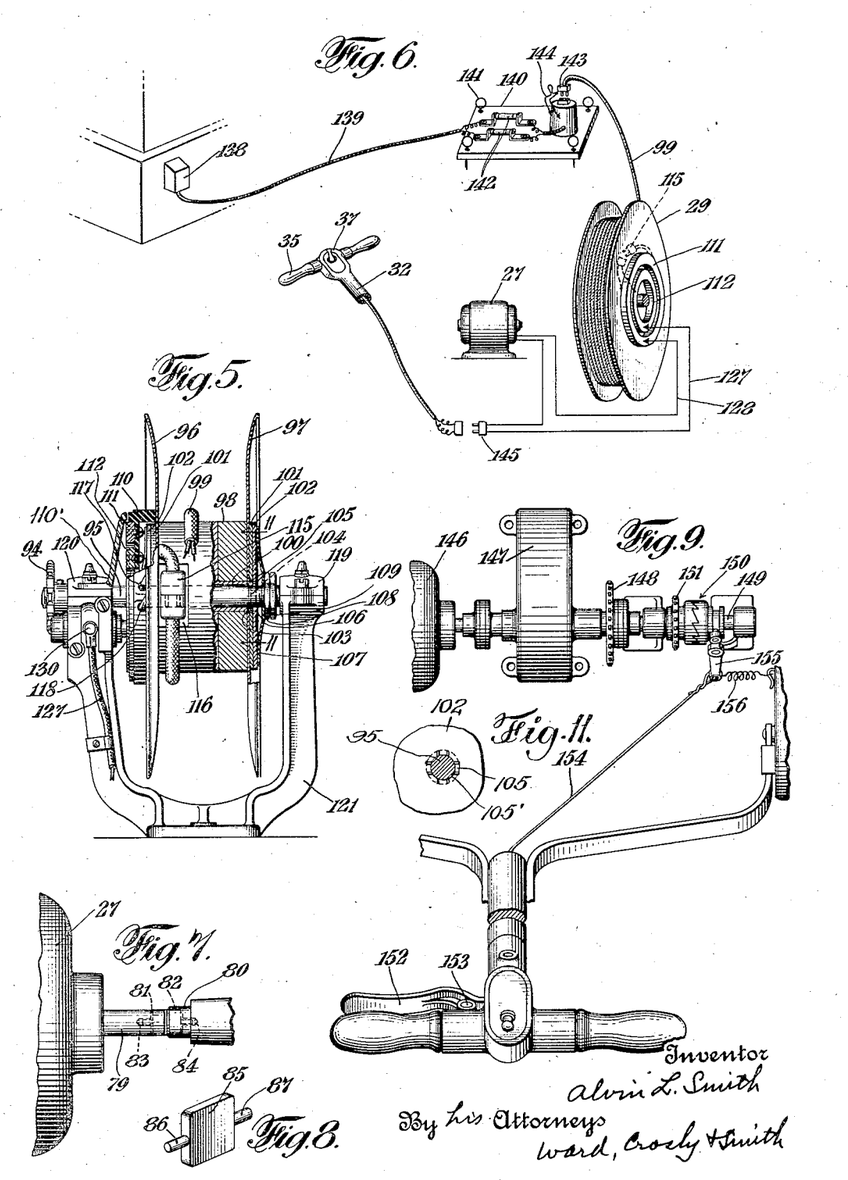
Fig. 5 is an elevational view partly in section showing the conductor take-up reel.
Fig. 6 is a diagrammatic illustration of the electrical connections which may be used with the machine of this invention.
Figs. 7 and 8 illustrate in detail a coupling arranged in the motor shaft.
Fig. 9 illustrates parts of a modified form of machine embodying a clutch in the driving mechanism, such clutch being operable from the handle bars of the machine.
Fig. 11 is a sectional view, partly broken away, and taken substantially along line 11—11 of Fig. 5.

The motor may be coupled to the reduction gear assembly mechanism 28 through a suitable coupling as shown in Figs. 7 and 8, which provides for limited universal movement of the motor shaft and reduction gear shaft in respect to each other. The motor may be provided with a shaft 79, the end of which closely abuts the end of a shaft 80 of the reduction gear assembly. The abutting ends of the shafts are slotted transversely to an appreciable depth as at 81 and 82, and the bottom of each slot being provided respectively with recesses 83 and 84 extending co-axially with the shafts. A coupling member 85 may comprise a flat rectangular member provided at opposite edges with pins 86 and 87 to be received within the recesses 83 and 84 respectively. The coupling member is of such dimensions that considerable clearance is provided with the transverse slots and recesses within the shafts. Through this coupling power is constantly applied to the gears of the reduction gear assembly whenever the current to the motor is turned on.

The reduction gear assembly may be of any suitable type, preferably light in weight and compact and providing a speed reduction ratio in the neighborhood of 41 to 1 in the particular machine illustrated.

The low speed from the reduction gear assembly is delivered to a shaft 88 at the side of the gears opposite from the motor (see Figs. 1 and 3). The shaft 88 may be provided with a pair of sprockets 89 and 90 respectively for driving the differential gear 37 through a chain 91 and the take-up reel 29 through a chain 92. The chain 91 engages the sprocket 41 of the differential gear assembly above referred to. The end of the shaft 88 may be received in a suitable bearing supported upon a bracket 93, secured to the base of plate 26.

The chain 92 engages a suitable sprocket 94 mounted upon a shaft 95 upon which the reel 29 is also mounted. The reel as illustrated in Figs. 3 and 5 may comprise a pair of side flanges 96 and 97 fixed to the ends of a laminated wooden core member 98 upon which a conductor cable 99 may be wound. The wooden core member may be provided centrally with a metallic bearing sleeve 100 through which the shaft 95 extends. The reel is rotated by the shaft through a friction drive comprising a pair of frictionally engaging discs 101 and 102 made of brass and a suitable form of brake lining material respectively. The disc 101 may be fixed to the flange 97, while the disc 102 is fixed to rotate with the shaft 95 by means of a drive collar 103. This drive collar is fixed upon the shaft by a pin 104 and is provided with a toothed end portion 105 engaging a corresponding notched portion 105′ at a central opening through the disc. (See Fig. 11.) The central opening through the disc 101 is circular and the portion of the drive collar that extends into the opening is cylindrical and accordingly does not interfere with any independent turning movements of the disc 101. The discs 101 and 102 are urged into frictional contact by an annular spring member 106 provided with a plurality of spring fingers as at 107 engaging the disc 102. The tension of the spring member and of its spring fingers may be adjusted and maintained by a nut 108 threaded to the reel shaft and accompanied by a lock nut 109.

The left hand side of the reel may also be provided with frictional driving means similar to that on the right hand side of the reel, as just described.

The friction drive means at the left hand side of the reel is covered by an insulating cap member 110, upon which a pair of contact rings 111 and 112 may be mounted. The contact rings and the insulating support 110 therefor are fixed to the flange 96 by means of a spider member 113 provided with attaching lugs at 114.

The conductor 99 may be provided with a quick detachable connector 115 lodged within a cavity 116 formed in the wooden hub member 98. Conductor terminals 117 and 118 are secured respectively to the contact rings 111 and 112. If the conductor 99 should become completely unwound from the reel during the operation of the lawn mower, the parts of the quick detachable connector will become separated, thus disconnecting the cable and preventing excessive strain thereon or breakage.

The reel shaft 95 may be received in bearings 119 and 120 positioned at each side of the reel, such bearings forming a part of a reel supporting fork 121. The supporting fork in turn may be bolted to an arm 122 fixed to the bed plate 26, for instance see Fig. 3. Beneath the bearing 120 the supporting fork 121 may be provided with suitable clamping portions 123 and 124 for holding brushes 125 and 126 respectively. These brushes may be of any suitable type, such for example as used with motor commutators, and serve respectively to conduct current from connector wires 127 and 128 to the contact rings 111 and 112. The clamping portions 123 and 124 are provided with suitable insulated binding posts 129 and 130 respectively to which the terminals of the connecting wires may be attached.

With the above described reel construction, whenever the motor current is turned on, the electric drive mechanism serves to continually apply rotational force to the reel through the friction drive in a direction tending to wind the conductor upon the reel. The spring member 106 of the friction drive should be properly adjusted by means of the nuts 108 and 109 in order that sufficient rotational force may be exerted to keep the conductor fairly taut during the operation of the lawn mower but permitting slipping of the friction drive when or as soon as the conductor is wound taut and when the lawn mower is traveling away from the source of current supply.

Taking into consideration the diameter of the drive wheels and of the reel, the sprockets 41, 89, 90 and 94 should be of such relative sizes that the linear speed at which the conductor is taken up by the reel may slightly exceed the speed at which the lawn mower travels. As a result of such design the conductor is kept under a slight tension regardless of the movements of the machine.

From the reel 29, the conductor 99 may be led over a pulley 131 rotatably mounted upon a shaft 132, which in turn is fixed within a support and guard member 133. The pulley 131 should preferably be so mounted that its periphery will be approximately tangent to the average conductor turn as wound upon the reel 29. In other words, the pulley 131 should be mounted at a position substantially centrally of the reel 29, measured in a direction longitudinally of the reel shaft. Along a line transverse to the reel shaft, the pulley should be so placed that its periphery, at the point where the conductor is first received, is directly over one of the middle layers of the conductor turns as wound upon the reel. With the pulley thus mounted, the conductor may be led from the reel over the pulley with substantially minimum friction and very little possibility of jamming. The support and guard member 133 may be provided with an annular base portion 134 through which the conductor 99 passes. The portion 134 may be received within a supporting ring 135 and as indicated in Fig. 3 is swivelled with respect thereto in order to permit the pulley and its support to lead the conductor away from the machine in any horizontal direction. The support 135 may be fixed to the bed plate by suitable standards as at 136.

In order to shield the motor and associated driving mechanism from flying grass during the operation of the machine, a suitable shield member 137 may be attached to the rear edge of the bed plate and extends rearwardly and upwardly in a general direction along the handle bails 33 and 34. A suitable shield or cover 110′ protects the contact rings 111 and 112. This shield is illustrated in Figs. 3 and 5 but is omitted in Figs. 1 and 2.

As indicated in the drawings, the various bearings including the reel bearings, the motor shaft, the reduction gear shaft bearings, the differential gear and the drive wheel shaft bearings may all be provided with conventional forms of pressure lubricating fixtures.

For supplying the electric current to the lawn mower, a suitable terminal box as at 138 (see Fig. 6) may be connected to an ordinary household lighting circuit or other source of supply and mounted on the exterior of a building. If the area of the lawn upon which the machine is to be used is large, a conductor cable 139 may be led to a suitable portable junction board as at 140. This junction board may be temporarily pegged to the ground by pins as at 141 and may be provided with fuses 142 and a quick detachable connector 143. In order to permit a slight tension upon the conductor 99, the connector may be provided with a suitable retaining clamp 144.

As previously stated, the conductor 99 extends to the reel and is wound thereupon, the inner end being provided with the detachable connector 115, from which the current passes to the contact rings 111 and 112. The connector wire 127 may extend first to a detachable connector 145 positioned at the base of the handle 32. This connector permits the handle to be readily detached without breaking the wires. The current from connector 145 flows through the control switch 37, back through the connector and to the motor 27. The connector wire 128 may extend directly from the reel to the motor.

In Fig. 9 a portion of a somewhat modified type of construction is illustrated. A suitable motor 146 and reduction gear assembly 147 are provided for constantly driving a sprocket 148, which in turn constantly applies rotational force to take-up reel of a type such as previously described. A constantly driven shaft 149 may be provided with a suitable clutch mechanism 150 for controlling the rotation of a sprocket 151. The sprocket 151 corresponds in use to the sprocket 89 for driving the drive wheel shaft in the machine above described. The sprocket 151, however, is controlled through the clutch 150, which in turn may be controlled from the handle of the lawn mower by means of a lever 152. The lever 152 may be arranged adjacent one of the handle bars and pivoted thereto, as at 153. A suitable cable 154 or other means may be provided to operatively connect the handle to a clutch lever 155. A spring 156 which may be secured to the adjacent frame portion normally holds the clutch in a closed position, as illustrated in the drawings, but when it is desired to stop the lawn mower, this may be accomplished by throwing out the clutch merely by pressing the lever 152. Rotational force continues to be applied to the reel, however, and if it is desired to manually move the machine through short distances, the conductor is still kept taut.

Figure 10:
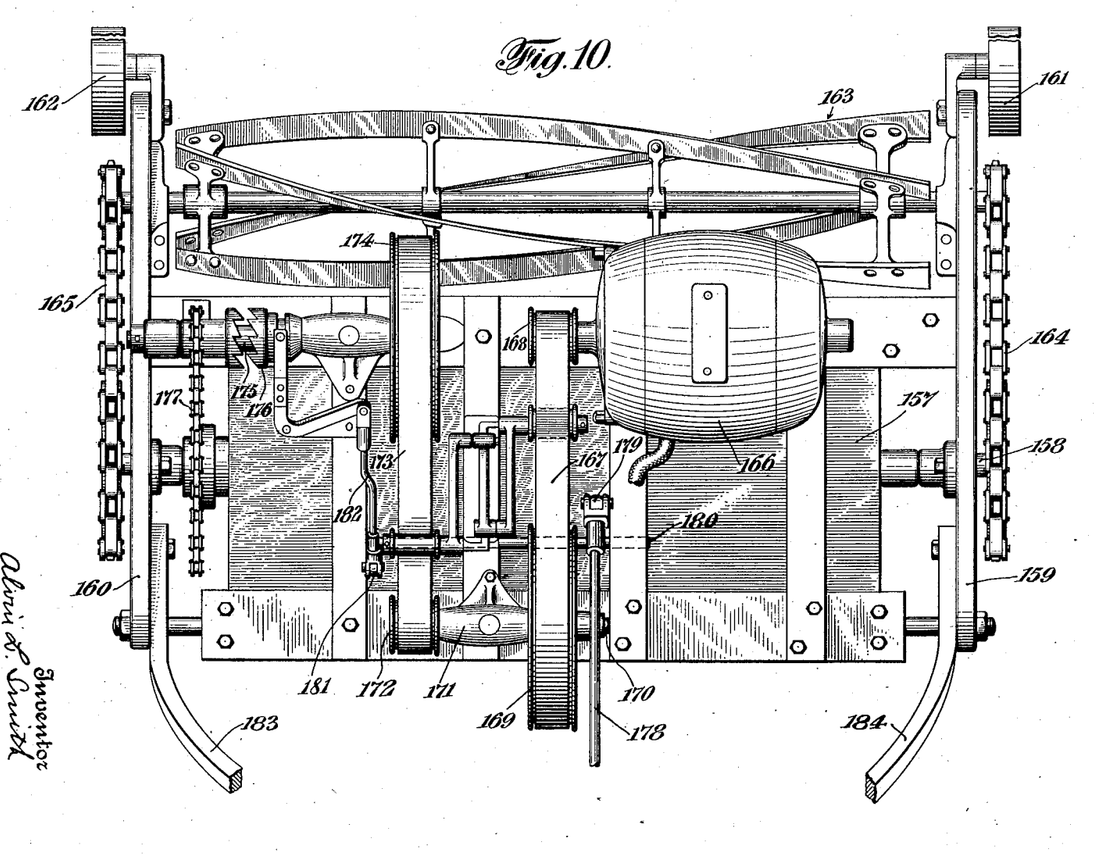
Fig. 10 is a plan view illustrating a form of the invention as applied to a roller type lawn mower.

In the roller type of machine as illustrated in Fig. 10, a lawn roller 157 is mounted upon a suitable shaft at 158 journaled in side frames 159 and 160. The forward ends of the side frames may be provided with suitable wheels 161 and 162, respectively.

A revolving cutting assembly 163 is mounted at the forward portion of the machine and is connected through sprocket and chain drives 164 and 165 to be operated from the roller and shaft 158. An electric motor 166 is provided and receives its current through a conductor wound upon a suitable take-up reel, either of the type above described or one which may be mounted in fixed position at a point remote from the machine. In the machine here illustrated a belt and pulley arrangement is provided for obtaining the desired speed reduction. A belt 167 runs upon a motor pulley 168 and a pulley 169. The pulley 169 may be mounted upon a shaft 170 journaled in a bearing 171 fixed upon the frame. A small pulley 172 is rotated by the shaft 170 and supplies power to a belt 173 running over a pulley 174. The pulley 174 is in turn rotatably mounted upon a drive shaft 175. Suitable clutch mechanism 176 is provided for controlling a sprocket and chain drive 177 for driving the roller shaft 158. The clutch 176 is arranged to be operated from the handle of the lawn mower through a connecting rod 178, a lever 179, shaft 180, lever 181 and connecting rod 182. The lawn mower handle may be attached to the machine through conventional handle bails 183 and 184.

While I have described my improvements in detail with respect to several embodiments thereof, I do not desire to be limited to such details or embodiments since many further changes and modifications may be made and the improvements applied to widely different forms of structures without departing from the spirit and scope of the improvements in their broader aspects. I therefore desire to cover all forms coming within the language or scope of any one or more of the appended claims.

What I claim as new and desire to secure by Letters Patent of the United States, is:

1. A lawn mower comprising a frame, wheels supporting said frame; driving mechanism comprising an electric motor, a reduction gear assembly and shafts therefor arranged substantially in alignment between said wheels; grass cutting means operated by said driving mechanism; a steering handle independent of said mechanism and secured to the frame; and a take-up reel for the conductors to the motor mounted on the frame to the rear of and above said driving mechanism and driven thereby.

2. A lawn mower comprising a frame, wheels supporting said frame; driving mechanism comprising an electric motor, a reduction gear assembly and shafts therefor arranged substantially in alignment between said wheels; grass cutting means operated by said driving mechanism; a steering handle independent of said mechanism and secured to the frame; and a take-up reel for the conductors to the motor mounted to rotate upon a horizontal shaft which extends in a fixed position parallel to said reduction gear shafts and driven thereby.

3. A lawn mower comprising a frame, a pair of drive wheels, a control handle extending upwardly and rearwardly from said frame, electric driving mechanism mounted between said drive wheels and substantially in alignment therewith, and a take-up reel drum for the conductor to said electric mechanism, said reel drum being positioned over the base of said handle and to the rear of said mechanism and driven by said mechanism through a slip clutch comprising friction discs mounted flatwise against the side of said reel drum.

4. In combination with a lawn mower operated by an electric motor, a take-up reel mounted thereon for a conductor to the motor, means for rotating said reel by the motor, a pulley above the reel for receiving the conductor and having a swivelled mounting permitting the conductor to be freely led therefrom and supporting legs for said mounting straddling said reel and secured to the mower frame.

5. In combination with an electrically operated lawn mower, means for conducting current thereto comprising an extension cord for connection to a current source and terminating in a portable junction device, means for removably fixing said device to the lawn, a conductor fixed to said junction device and extending to the lawn mower, a take-up reel for said conductor, and means normally exerting a continuous rotational force upon the reel in a direction to wind the conductor thereupon.

6. In combination with an electric motor operated lawn mower, means for conducting current thereto comprising an extension cord for connection to a current source and terminating in a portable junction device provided with fuses, means for removably fixing said device to the lawn, a conductor fixed to said junction device and extending to the lawn mower, a take-up reel for said conductor mounted on the mower, and means connected to the electric motor for exerting a predetermined limited rotational force upon the reel in a direction to wind the conductor thereupon.

7. In combination with a lawn mower operated by an electric motor, a reel mounted thereon for a conductor to the motor, means for continually applying rotational force from the motor to the reel in a direction to wind the conductor thereon, a clutch mechanism, said means also serving through said clutch mechanism to propel the mower, a handle for steering and controlling the mower, and controlling means for said clutch mounted upon said handle whereby the mower may be manually operated while the motor driven reel continues in operation.

8. A lawn mower comprising a frame, wheel members supporting said frame; driving mechanism comprising an electric motor, a speed reduction assembly and shafts therefor arranged substantially centrally of the frame and along lines parallel to the axis of said wheel members, grass cutting means operated by said driving mechanism, a steering handle independent of said mechanism and secured to the frame, and a take-up reel for the conductors to the motor, said reel being operated by the motor through said assembly and also mounted substantially centrally of said frame with its axis horizontal.

9. An electric lawn mower provided with drive wheels and having an electric motor mounted thereon, a take-up reel mounted thereon for a conductor to the motor, means for rotating the drive wheels by power from the motor, and means including a friction clutch for operatively connecting said motor to apply a predetermined limited rotational force to the reel to wind the conductor thereon at a linear speed at least equal to the speed of travel of the lawn mower and to continually keep the conductor taut during operation of the motor but regardless of the lawn mower travel.

10. A two wheeled lawn mower having an electric driving motor operatively connected to the wheels, a control and steering handle extending upwardly and rearwardly from the mower, a take-up reel mounted on the mower for a conductor to the motor, and means including a friction clutch for operatively connecting said motor to apply a predetermined limited rotational force to the reel to wind the conductor thereon at a linear speed at least equal to that of the lawn mower travel and to continually keep the conductor taut but with insufficient tension to overcome the mower tractive force, said friction clutch being designed to slip when the conductor is taut or its tension reaches a predetermined value, exerting insufficient force to upset or misdirect the lawn mower.

11. A two wheeled lawn mower having an electric driving motor operatively connected to the wheels, a control and steering handle extending upwardly and rearwardly from the mower, a take-up reel mounted on the mower for a conductor to the motor, and means including a friction clutch for operatively connecting said motor to apply a predetermined limited rotational force to the reel to wind the conductor thereon, said reel being mounted in fixed position upon a horizontal shaft, and means at a fixed point centrally of the mower for supporting and guiding the conductor as it is wound on and unwound from said reel.

12. An agricultural implement provided with drive wheels and having an electric motor mounted thereon, a handle extending from the implement for guiding and controlling the movement thereof, members adapted to be gripped by the hands of the operator extending transversely from said handle, for guiding the travel of the implement, clamping means for joining said members and handle, and a switch carried in said clamping means for controlling the circuit of the motor.

In testimony whereof I have signed my name to this specification.

ALVIN L. SMITH.